United States Patent [19]

de Breze

[11] 4,444,717
[45] Apr. 24, 1984

[54] APPARATUS FOR REMOVING ENERGY

[75] Inventor: Anne de Breze, Laguna Niguel, Calif.

[73] Assignee: Philip A. Putman, Huntington Beach, Calif.

[21] Appl. No.: 372,075

[22] Filed: Apr. 26, 1982

Related U.S. Application Data

[63] Continuation-in-part of Ser. No. 177,572, Aug. 13, 1980, abandoned, which is a continuation-in-part of Ser. No. 974,117, Dec. 28, 1978, abandoned.

[51] Int. Cl.³ .............................................. G21G 1/10
[52] U.S. Cl. ................................. 376/194; 376/100; 376/146; 376/108; 376/287; 376/402; 165/47
[58] Field of Search ............... 376/190, 192, 194, 195, 376/290, 100, 108, 117, 146, 402, 287; 165/47, 185

[56] References Cited

U.S. PATENT DOCUMENTS

| | | | |
|---|---|---|---|
| 2,929,933 | 3/1960 | Ela, Jr. et al. | 376/192 |
| 4,154,651 | 5/1979 | Kenworthy et al. | 376/290 |
| 4,283,631 | 8/1981 | Turner | 376/108 |
| 4,309,249 | 1/1982 | Steinberg et al. | 376/192 |

FOREIGN PATENT DOCUMENTS

| | | | |
|---|---|---|---|
| 2804560 | 8/1978 | Fed. Rep. of Germany | 376/290 |
| 893783 | 4/1962 | United Kingdom | 376/100 |

OTHER PUBLICATIONS

J. of Inorganic & Nuclear Chemistry, 1976, vol. 38, No. 1, pp. 13–17.
Nuclear Physics, 24 (1961), pp. 675–681.
Nuclear Physics, II (1959), pp. 1–5, 105–111, Ajzenberg-Selove et al.
Int. J. of Applied Radiation and Isotopes, 1976, vol. 27, pp. 263–266, Scholz et al.

Primary Examiner—Harvey E. Behrend

[57] ABSTRACT

A process to produce energy with the fusion of hydrogen and carbon in a thermonuclear fusion reaction with an extension, wherein carbon targets are bombarded with a beam of fast protons at temperatures of 457 kev. The thermonuclear fusion reaction produces two helium atoms and two neutron particles.

The neutrons are captured by a blanket of lithium 7 which cools the walls and carries the heat to a turbulent heat exchanger, then to a generator and turbine complex which generates energy, giving tritium as a subproduct.

The helium atoms plus alpha particles and protons are extracted to the reactor's extension where, combined with the tritium emitted in the first cycle of the thermonuclear fusion reactor, they go to generate more energy.

This process becomes self-maintaining once the thermonuclear fusion reactor is put into operation.

4 Claims, 5 Drawing Figures

APPARATUS FOR REMOVING ENERGY

This is a continuation in part to my application for patent Ser. No. 177,572 filed Aug. 13, 1980 (now abandoned) which in turn is a continuation in part to application for patent Ser. No. 974,117 filed Dec. 28, 1978, (now abandoned).

This invention is a process to liberate energy by the fusion of hydrogen and carbon in a thermonuclear fusion reactor with an extension.

BACKGROUND OF THE INVENTION

The possibility of bringing fusion out of the dark ages of science and into the new century is a great incentive. Coupled to the economic advantages and safety, fusion energy has the opportunity of opening great wastelands to agriculture and turn desolate places into blooming populated areas.

On the other hand, thermonuclear fusion experiments (e.g. tokamaks, Scylla, Scylla O Pinch, pellet reactor, toroidal Z Pinch) have yet to show a way to economic and engineering advantage over fission and breeder reactors. But when all the problems have been solved, the neat yield in a fusion reactor will be five times that of fission and will produce one-tenth as much energy per neutron released. The first fusion reactor, apart from opening the way to better technologies, will be large and clumsy. But all these irregularities will compensate for the competitive production and safety.

In the present invention, I use the hydrogen-carbon-helium nuclear cycle, performing in a thermonuclear fusion reactor. This reactor comprises a tube chamber which holds the plasma in a material wall, at the same temperature, without magnetic fields and discards the confinement theory.

SUMMARY OF THE INVENTION

According to the present invention, a 500 kev beam of fast protons, made of neutral hydrogen ionized with electrons or D-ions, and which comes from a linear accelerator (13-FIG. 5), built according to known engineering techniques, enters the front of the reactor's chamber and which is schematically portrayed on the left side of the reactor's chamber on FIG. 1.

This beam of fast protons is manipulated by magnets (not shown), in the normal way, will strike, in a sweeping way, the carbon targets indented in front of the holes and in the center of the first lattice (6-FIG. 1), causing several thermonuclear fusion reactions to take place, as explained below, producing a strong energy plasma.

The lithium 7 blanket which is pumped in at the top of the reactor chamber and flows down the walls of the reactor till it reaches the bottom of the reactor's chamber (11-FIG. 1), will carry away the neutrons generated in the thermonuclear fusion reactions, and it will cool, at the same time, the reactor's walls. The neutrons are, then, carried to the turbulent heat exchanger, and after the tritium has been extracted from the lithium 7 blanket, the steam is taken to a generator and turbine complex which generates electric power in the usual way.

The tritium extracted from the liquid lithium 7 blanket is taken to a tritium injector (21-FIG. 3) and placed next to the exhaust processing facility (14-FIG. 4).

Inside the thermonuclear fusion reactor, ten minutes after ignition, the plasma (helium, alpha particles and protons), is extracted from the reactor chamber through the second lattice (10-FIG. 1), by the exhaust (14-FIG. 1), and pumped on to the reactor's extension (FIG. 3). Here, this plasma is mixed with the tritium, obtained from the recycled liquid lithium 7, where it makes a secondary plasma which travels across the magnetic field because the temperature of the electrons is relatively low and the resistance is, henceforth, relatively high. As a result, the magnetic field is able to penetrate the plasma and separate its components, the electrons whirl in one direction and the ions in the opposite direction. This produces a space-charge electric field, at right angles, and this compels the plasma to move perpendicular to both fields. The plasma is then discharged into conductors (18-FIG. 3), from which high voltage DC power can be collected directly. The ignition temperature is $4.6 \times 10^7$ and $4.1 \times 10^{8°}$ K. and the thermonuclear power densities are in the range of 100 and 1000 watts/cm$^3$ with continuous operation. The densities of the particles are $6 \times 10^{22}$ ion $\times$ cm$^3$ $\times$ sec.

The reactor's extension (FIG. 3) consists of a half-circle, 100-meters long (15-FIG. 3), with a magnetic field configuration (16-FIG. 3), DC-AC inverter-rectifier (19-FIG. 3), vacuum (20-FIG. 3) and tritium injector (21-FIG. 3).

The reactor's extension has no liquid blanket or moving parts which will make this secondary reactor more effective and economic.

In a regular operation the thermonuclear fusion reactor generates energy in both the first and secondary complexes.

This process becomes self-maintaining once the thermonuclear fusion reactor is put into operation.

If the energy production of this two-section thermonuclear fusion reactor (FIG. 5) is too large, in other words, has too much energy output, I would recommend integrated installations, about ten, to supply this country or a national grid which would take care of the supply nicely.

DESCRIPTION OF DRAWINGS

FIG. 2—This is a schematic drawing showing a front view of the first lattice (6) with carbon targets (7) imbedded in the center holes and liquid blanket of lithium 7 underneath the graphite plank, and second lattice with ¼ inch holes with no carbon targets in them. It also shows one carbon target imbedded in front of a hole and resting on a Micalex chamber. The holes are machined in.

DETAILED DESCRIPTION OF INVENTION

Figure 1:
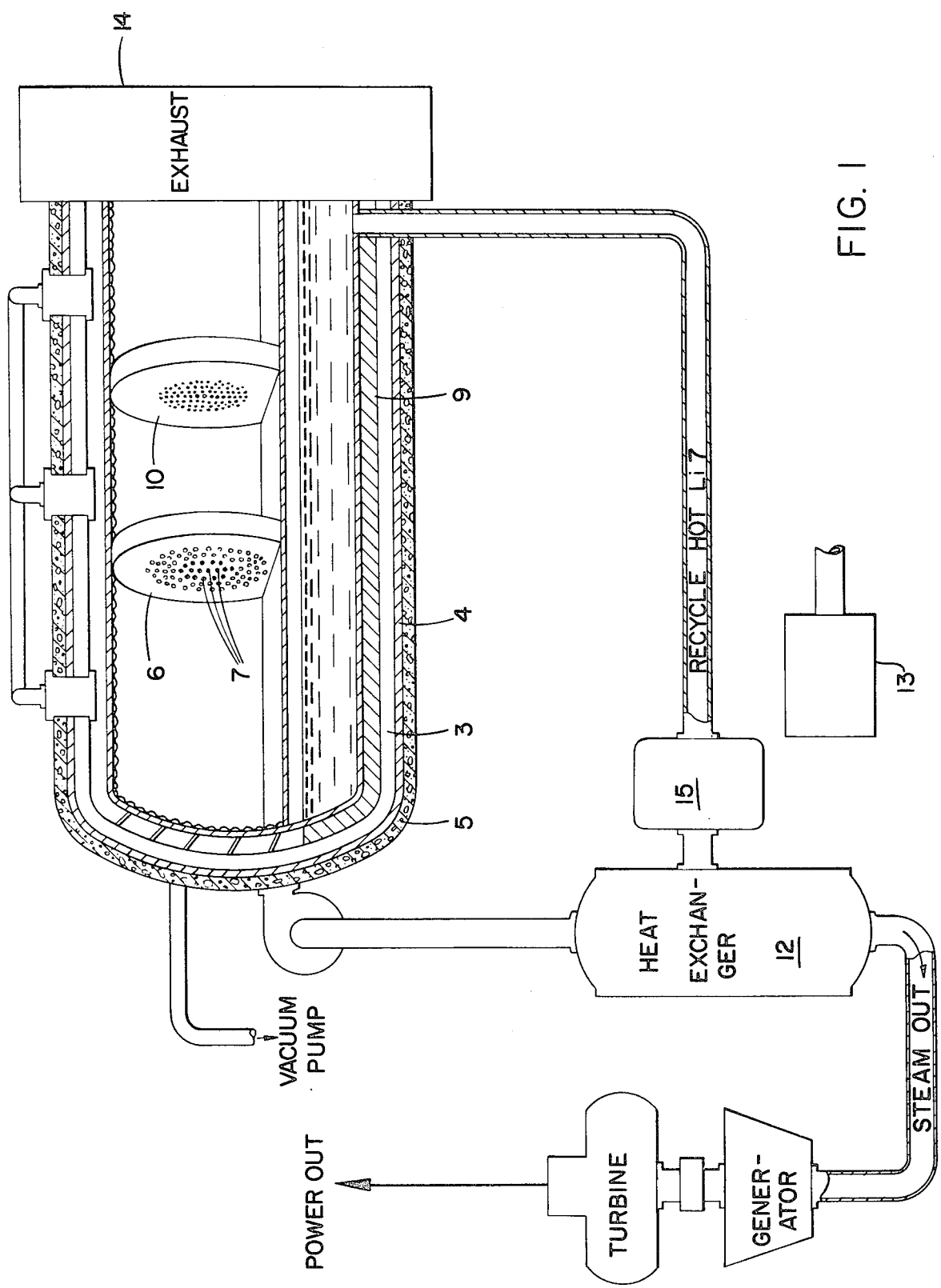
FIG. 1—This is a schematic drawing of the thermonuclear reactor. It comprises three top pumps which let flow the liquid blanket of lithium 7, first and second lattice resting on a plank of solid graphite, the bottom of the chamber with the circulating liquid lithium 7 blanket and a view, not to scale, of the different walls which cover the reactor chamber. It also shows the electric complex and other facilities.

This fusion process is based on the fact that by subjecting a carbon target to the bombardment of a beam of fast protons at a temperature of 457 kev, the hydrogen penetrates the carbon nucleus and since it cannot hold more than four such protons, at one time, when this saturation is reached, it emits two helium atoms and two neutron particles, as fast as the new protons arrive. The whole cycle takes about ten minutes. The only prerequisite is that the temperature must be kept constant at 457 kev.

In this transformation carbon acts as an energy catalyst since it is in no way changed by the process of converting hydrogen into helium. This metamorphosis takes place in a thermonuclear fusion reactor of 6-meter longitude and a radius of 2.50-meters. The reactor chamber is divided into twelve segments, six segments of 1-meter each, in width, on each side on the reactor chamber. Each segment has two quadrants, divided on the equatorial line of the reactor for easier accessibility and handling. The inside wall is made of corrugated graphite composite and behind this wall runs the blanket of lithium 7. This liquid blanket is pumped in through a set of three pumps placed at the top of the reactor and flows through a set of trays of graphite composite along the side walls of the reactor chamber behind the first inner wall and keeps flowing till it reaches the bottom of the reactor chamber where it flows to the right, thence, it exits to the turbulent heat exchanger facility, where it is removed of the tritium and recycled before it is again brought in up to the top of the reactor's pumps to start the process all over again. The trays on which the blanket of lithium 7 passes through in order to cool the walls are slanted toward the inner chamber wall and are made to fit the width of each segment between the innermost wall and the second inner wall. The top tray has ¼ inch holes every ¼ inch and these holes get smaller and smaller on each consecutive lower tray. The reason for the holes to get smaller on each consecutive tray and more numerous as the trays go lower on the reactor wall, is done in order to slow down the flow of the blanket of lithium 7 and thus keep the wall covered with the blanket at all times.

The top tray is 5-cm. from the top of the inner reactor chamber. These trays are removable and can be replaced by pulling off one segment or quadrant.

The blanket structure's walls are made with graphite composite. The blanket structure is followed by an aluminum-alloy water cooled structure (3-FIG. 1), and this in turn, by a ceramic liner (4-FIG. 1), and lastly, by 3-meters of reinforced concrete (5-FIG. 1). Inside this chamber, 3-meters from the left, there is a lattice made of 6-inch tungsten with 2-inch round holes machined in it and separated every 2-inches. The holes near the axis have the carbon targets, placed longitudinally in front of them (FIG. 2 & FIG. 4) and they rest on a Micalex chamber (8-FIG. 2).

The carbon targets are 3-inches×¾ inches outer diameter. The targets are made of zirconium and they are first heated (400° C.) in a good vacuum to remove impurities. Then, they are cooled in an atmosphere of carbon gas. In this manner, about 300-$cm^3$ of carbon gas are taken up per gram of metal.

Figure 2:
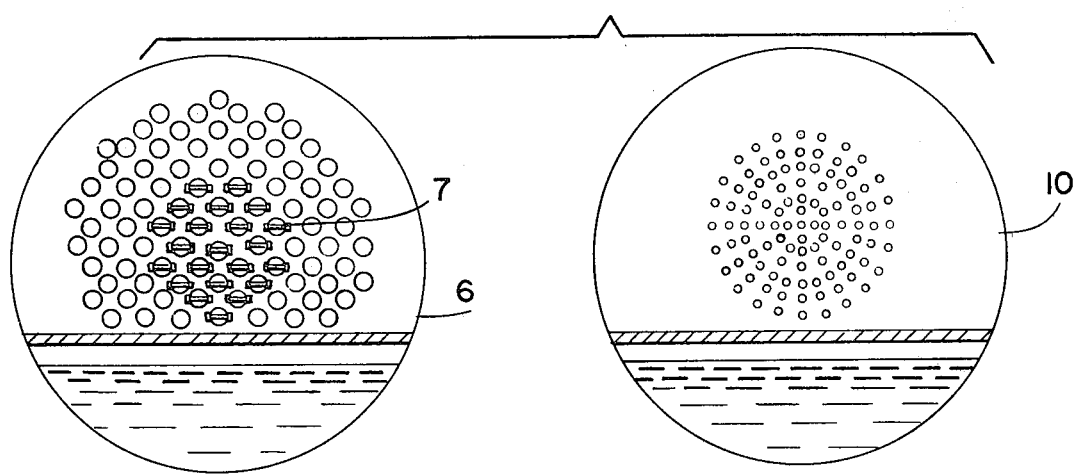
Figure 2:
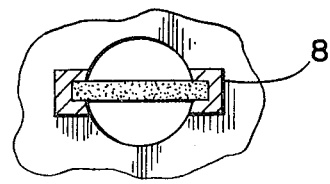
Figure 3:
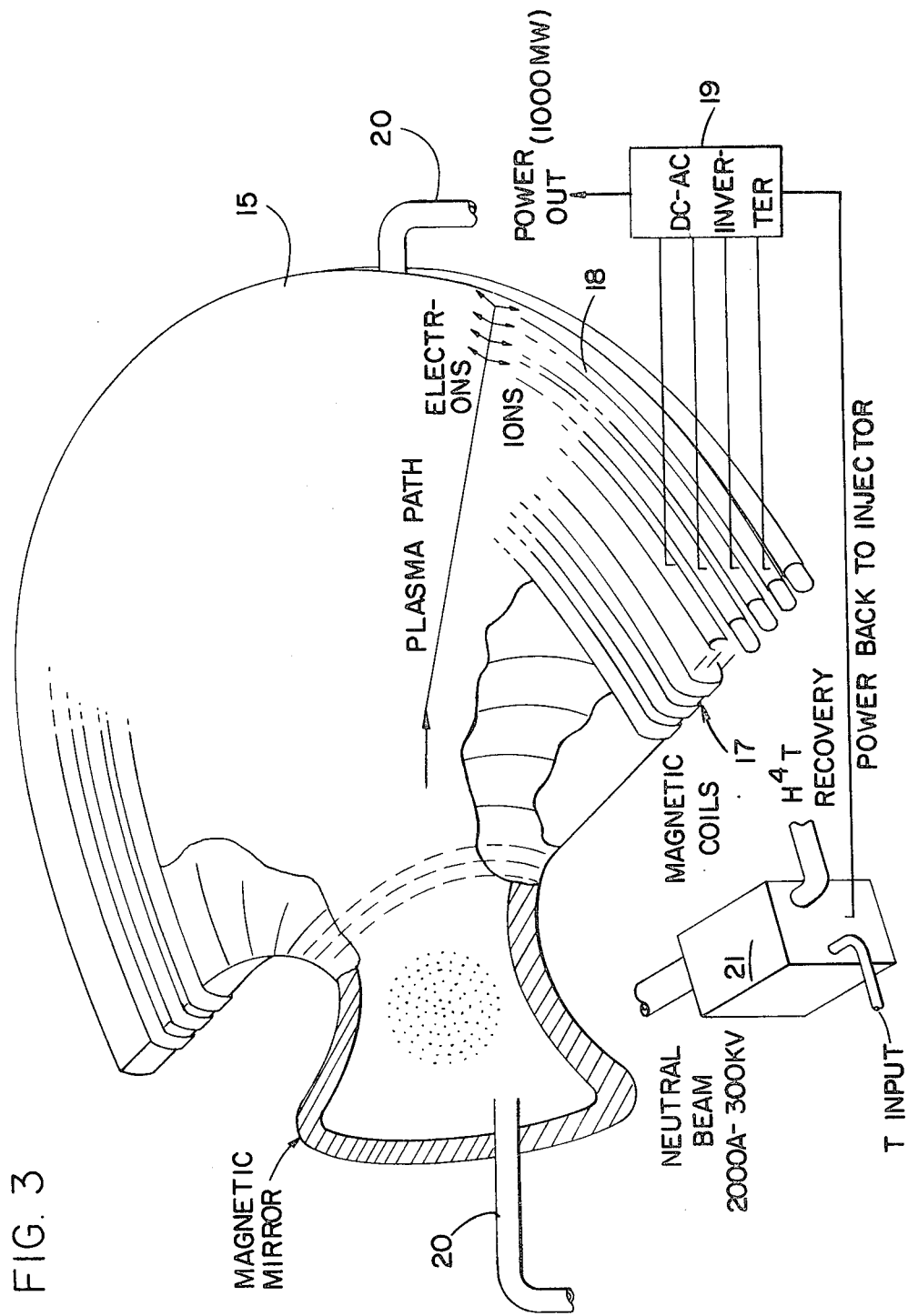
FIG. 3—This is a schematic drawing of the extension and linear accelerator and DC-AC inverter.
Figure 5:
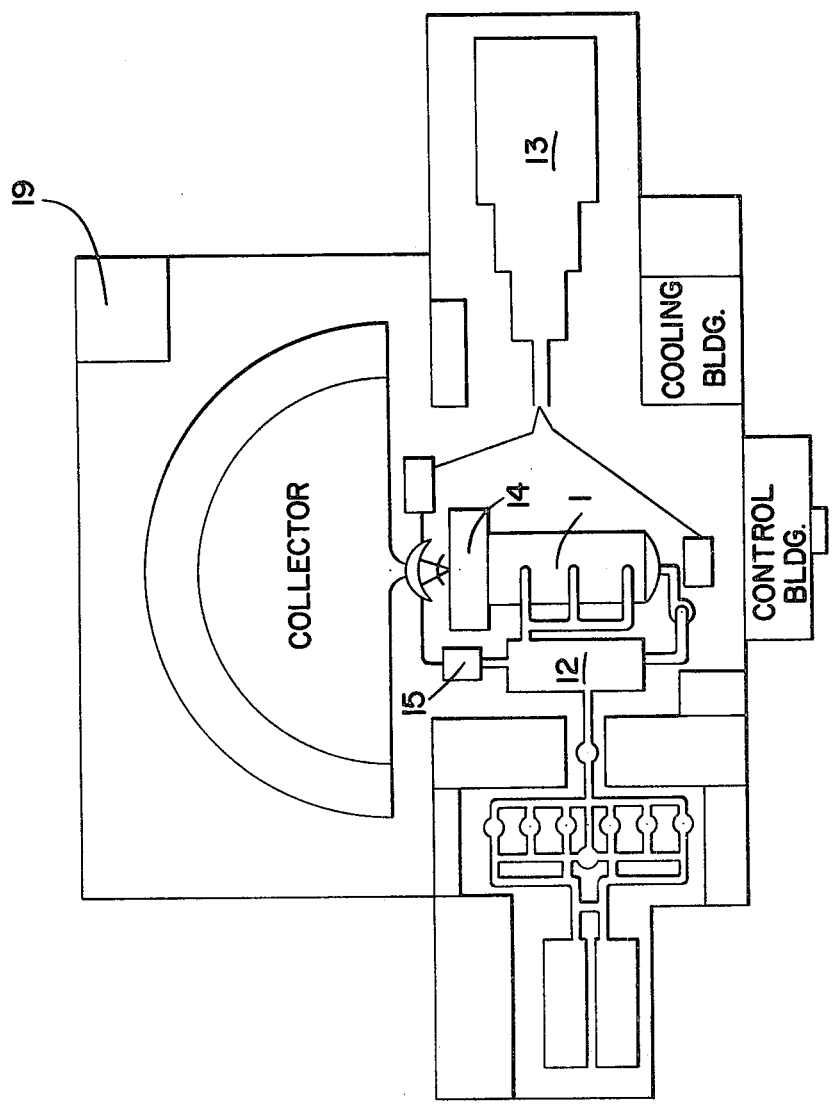
FIG. 5—This is a schematic drawing showing a top view of the thermonuclear fusion reactor complex, showing extension and contributing facilities.

The first lattice (6-FIG. 1) stops short 1-meter and 5-cm. from the floor of the reactor chamber and rests on a plank made of solid graphite composite (FIG. 2).

Two-meters after the first lattice, there is a second lattice made of 6-inch thick graphite composite (10-FIG. 1 & FIG. 2). This lattice is solid but for three feet radius at the center, where there are ¼ inch holes every ¼ inch. This second lattice, also, stops 1-meter and 5-cm. from the floor of the inside reactor chamber and rests on corrugated graphite composite.

Underneath this platform of corrugated graphite runs 1-meter blanket of liquid lithium 7 (FIG. 1), continuously, from left to right. The lithium 7 captures the neutrons and keeps the wall cool by carrying the heat back to the turbulent heat exchanger and tritium separator.

Figure 4:
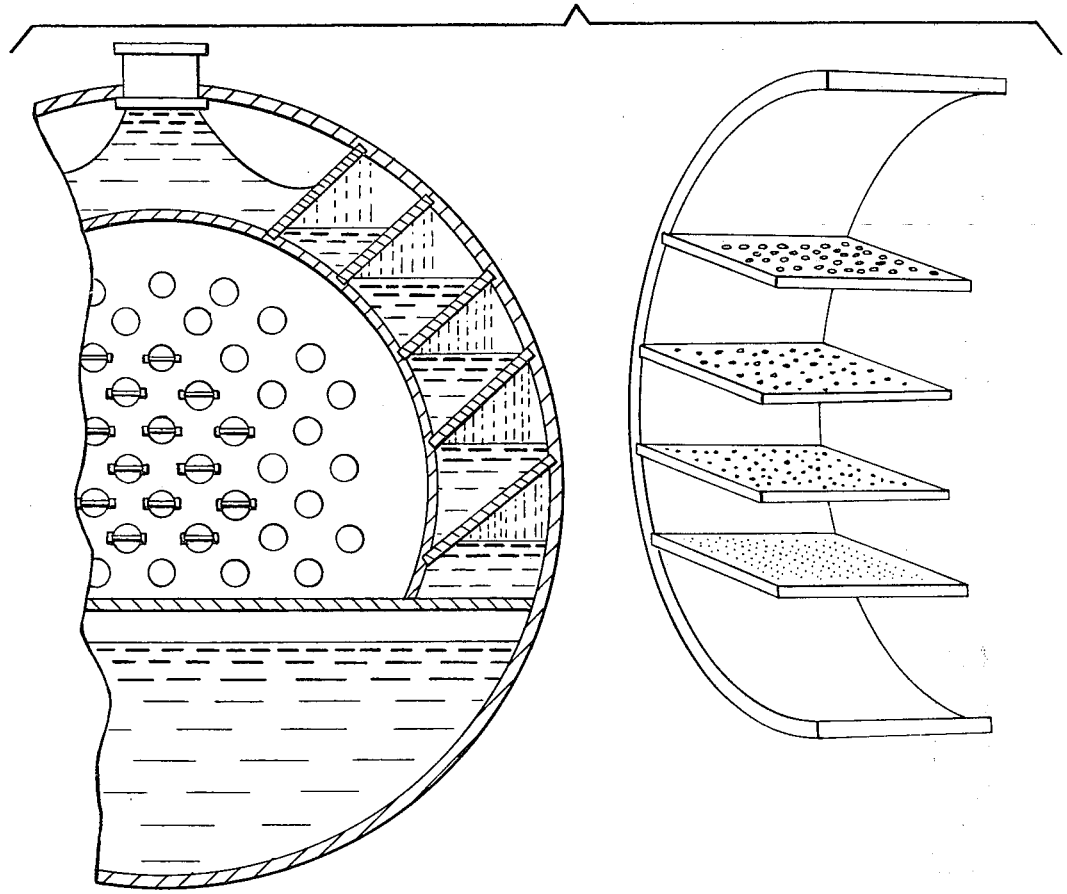
FIG. 4—This is a schematic drawing showing a front view of the first lattice (6) with carbon targets, trays, lithium 7 blanket flowing down from top pump. It also shows schematic drawing of arrangement of trays in one segment.

The reactor chamber is divided into 12 segments for easy accessibility and replacement (FIG. 4). The reactor chamber should be baked out at 400° C., and with reasonable pumping given a pressure of $10^{-8}$ mm. mercury. Energy currents combining magnetic storage with current diversion should be used.

The reaction rate in this reactor can be stated in the following equation: Reaction rate $= n_i n_j (\delta v)_{ij}/(1+\delta_{ij})$. $n_i n_j$ are the number densities of the reacting particles and v their relative velocities. The life expectancy of a particle in each reaction is inversely related to this rate. None of the reaction cross sections can be measured at high temperatures. However, a computer could help solve this problem. The energy input in this thermonuclear fusion reactor would be in the range of $10^5$ J and the energy (thermal) output $10^7$ J (approx.). Radiation at these high temperatures is no problem and can be reflected. Cross sections increase with the atomic number of the target and the result may be regarded as applying to the common impurities such as carbon, oxygen and nitrogen. The hydrogen-carbon cycle is so fascinating because of the advantages given by the formation of charged particles in fusion reactions. In the hydrogen-carbon cycle all the products are charged particles (atomic-nuclei), hence, all the energy produced, which could be tremendous, would be available internally and could be converted directly into electric power.

The contribution of the hydrogen-carbon cycle is of enormous importance. It goes like this:

| Reactions | Total energy balance |
| --- | --- |
| $C_{12} + H_1 \rightarrow N_{13} + \gamma$ | 2.0 |
| $N_{13} \rightarrow C_{13} + e + $ neutrino | $0.5 = (\frac{3}{8} \times 1.35)$ |
| $C_{13} + H_1 \rightarrow N_{14} + \gamma$ | 8.2 |
| $N_{14} + H_1 \rightarrow O_{15} + \gamma$ | 7.8 |
| $O_{15} \rightarrow N_{15} + e + $ neutrino | $0.7 = (\frac{3}{8} \times 1.85)$ |
| $N_{15} + H_1 \rightarrow He_4 + C_{12}$ | 5.2 |
| Total | 24.4 M.m.u. or $3.66 \times 10^{-5}$ erg. |

With carbon concentrations of 1 percent we have a rate of energy production of $\epsilon = 100$ erg/g. sec.

Other known carbon reactions take place inside the reactor, besides the ones mentioned, but they are not the preferred reactions in this process. The advantages of this new process are:

No fusion-product poisoning.
Very low rate change in temperature.
No fuel burn-up.
Control systems less than with other reactors.
No loading changes.
Almost uninterrupted reactor operation, at constant power, with no shutdowns.

No real danger to working personnel or outside population.
No nuclear wastes.
No disposal problems.
Minimal reactor operation.
Little power for cooling.
No corrosion or coolant disposal problems.
Inexpensive cost per unit flux.

TABLES

Table 1—Parameters of thermonuclear fusion reactor
Table 2—Parameters of reactor's extension.
Table 3—Plant Capital Investment.

TABLE 1

PARAMETERS FOR THE de BREZE THERMONUCLEAR FUSION REACTOR (Approx.)

| | |
|---|---|
| CHAMBER SHAPE | Cylindrical |
| CHAMBER DIMENSIONS | 6-meters × 2.50 meters |
| 14 MeV NEUTRON WALL LOADING | 5MW/m$^2$ |
| THERMAL POWER | 3360 MW |
| GROSS ELECTRICAL POWER | 1354 MW |
| NET ELECTRICAL POWER | 1000 MW + |
| RECIRCULATING POWER FRACTION | 38% |
| NET PLANT THERMAL EFFICIENCY | 50% |
| BEAM TYPE | Fast protons |
| BEAM ENERGY ON TARGET | 457 kev |
| BEAM EFFICIENCY | 26.7% |
| NUMBER OF FINAL BEAMS | 2 |
| ENERGY OUTPUT/BEAM | 45.8 KJ |
| BEAM WIDTH | 6.6 mm |
| TARGET YIELD AND GAIN | 170 MJ |
| FRACTIONAL BURN-UP FUEL | 25% |
| INITIAL FUEL MASS | 1 mg |
| GENERIC TARGET DESIGN | 3-inch × ⅜-inch carbon saturated zirconium bar. |
| CHAMBER STRUCTURE | Graphite composite |
| BLANKET BREEDING & HEAT TRANSPORT | Lithium 7 |
| TRITIUM BREEDING RATIO | 1.33 |
| TOTAL ENERGY BALANCE REACTOR | 3.66 × 10$^{-5}$ erg. |
| TOTAL LITHIUM 7 FLOW RATE | 3.12 × 10$^7$ kg/hr |
| AVERAGE LITHIUM 7 VELOCITY | 0.7 m/s |
| LITHIUM 7 INLET TEMPERATURE | 400° C. |
| LITHIUM 7 OUTLET TEMPERATURE | 600° C. |
| TOTAL REACTOR RADIATION OVER 50 YEARS | 3 Ci |

TABLE 2

PARAMETERS OF REACTOR'S EXTENSION (Approx.)

| | |
|---|---|
| GEOMETRY | Half circle |
| LONGITUDE | 100-meters |
| HEIGHT | 3-meters |
| ION COLLECTION ELECTRIC | 1380 MW |
| INVERTER RECTIFIER ELECTRIC | 1581 MW |
| GROSS ELECTRICAL POWER | 2598 MW |
| NET ELECTRIC CIRCUIT | 1000MW |
| NET EXTENSION EFFICIENCY | 75-90% |
| BEAM TYPE | neutral |
| BEAM ENERGY | 300kev |
| NUMBER OF BEAMS | 1 |
| MAGNETIC MIRROR | 500 G |
| COLLECTOR'S DEPTH | 21 meters |
| EXTENSION STRUCTURE | Stainless steel with low-vapor-pressure liquid tin. |

TABLE 3

PLANT CAPITAL INVESTMENT (In millions of 1982 dollars)

| | | |
|---|---|---|
| 1. | Structures and Site Facilities | $50.0 |
| 2. | Reactor with Extension | 180.0 |
| 3. | Reactor Plant Facilities | 154.0 |
| 4. | Turbine Plant | 30.0 |
| | Total | 414.0 |

TABLE 3-continued

PLANT CAPITAL INVESTMENT (In millions of 1982 dollars)

| | |
|---|---|
| Engineering (20%) | 82.8 |
| Contingency (25%) | 103.5 |
| Grand Total | $600.3 |

What I claim is:
1. Apparatus for removing energy produced by nuclear reactions comprising: a proton accelerator for producing a beam of protons, a reaction chamber in alignment with said proton beam, said reaction chamber having graphite walls and an aperture in one of said walls allowing entry of said proton beam, a target plate, the target plate positioned inside said reaction chamber in alignment with said aperture in position perpendicular to said proton beam, said target plate having a plurality of spaced-apart holes therein, with said holes having carbon-containing targets positioned therein, means for causing said proton beam to strike said targets to produce nuclear reactions, said nuclear reaction chamber having therein a blanket structure for removing said produced energy, said blanket structure comprising a shell-like structure positioned around a major portion of said graphite walls, the space between said shell-like structure and said graphite walls being divided into a series of trough-like chambers by means of a plurality of substantially horizontally extending perforated graphite plates, each of said graphite plates having one end attached to the graphite wall, each of said substantially horizontally extending perforated graphite plates being inclined upwardly towards and cooperating with the inner surface of said shell-like structure to form said series of trough-like chambers, means for pumping a liquid blanket material to the top of said shell-like structure for subsequent downward flow through said series of trough-like chambers by means of the perforations in said perforated graphite plates, the number and size of said perforations in each said perforated graphite plate being sufficient to insure that the liquid blanket material in each of said trough-like chambers will completely cover the outer surface of said major portion of said graphite walls, said liquid blanket material flowing through a circuit which includes said pump, a heat exchanger and the space between said graphite walls and said shell-like structure.

2. The apparatus of claim 1, wherein said liquid blanket material is lithium 7.

3. The apparatus of claim 1 wherein said target plate is formed of tungsten.

4. The apparatus of claim 1 wherein a perforated plate similar in size to said target plate is positioned in said reaction vessel spaced from and in axial alignment with said target plate, said target plate being positioned between said aperture and said graphite plate.

* * * * *

UNITED STATES PATENT AND TRADEMARK OFFICE
CERTIFICATE OF CORRECTION

PATENT NO. : 4,444,717
DATED : April 24, 19984
INVENTOR(S) : Anne DE Breze

It is certified that error appears in the above-identified patent and that said Letters Patent is hereby corrected as shown below:

Title page, item [54] and col. 1,
Titled of invention should read:
DESIGN FOR THERMONUCLEAR FUSION REACTOR Title page, item [57],
Abstract: Second line should read REACTOR instead of reaction.

Signed and Sealed this

Third Day of October, 2000

*Attest:*

Q. TODD DICKINSON

*Attesting Officer*  *Director of Patents and Trademarks*